(12) United States Patent (10) Patent No.: US 6,942,927 B2
Shepard et al. (45) Date of Patent: Sep. 13, 2005

(54) THERMOFORMABLE MULTILAYER POLYMERIC FILM

(75) Inventors: Mary E. Shepard, Oshkosh, WI (US); Robert J. Blemberg, Appleton, WI (US); Scott W. Middleton, Oshkosh, WI (US); Jerry F. Jesse, Neenah, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

(21) Appl. No.: 10/131,954

(22) Filed: Apr. 25, 2002

(65) Prior Publication Data

US 2002/0119334 A1 Aug. 29, 2002

Related U.S. Application Data

(63) Continuation of application No. 09/411,671, filed on Oct. 4, 1999, now Pat. No. 6,562,476.

(51) Int. Cl.$^7$ .............................................. B32B 27/32

(52) U.S. Cl. .................. 428/476.1; 428/475.5

(58) Field of Search .......................... 428/476.1, 475.5, 428/475.8, 474.9

(56) References Cited

U.S. PATENT DOCUMENTS

| | | | | |
|---|---|---|---|---|
| 4,755,419 A | * | 7/1988 | Shah | 428/220 |
| 4,909,726 A | * | 3/1990 | Bekele | 428/34.3 |
| 4,937,112 A | * | 6/1990 | Schirmer | 428/34.3 |
| 5,562,996 A | * | 10/1996 | Kuriu et al. | 428/474.4 |
| 5,837,358 A | * | 11/1998 | Bauer et al. | 428/213 |

OTHER PUBLICATIONS

BASF, "Ultramid B KR4407", printed from http://www.basf.com/static/OpenMarket/Xcelerate/Preview_cid–10510164364045_pubid–1044368075691_c–pparticle.html, Dec. 2003.*
BASF, "Ultramid B KR4418", printed from http://www.basf.com/static/OpenMarket/Xcelerate/Preview_cid–105106436405_pubid–1044368075691_c–pparticle-.html, Dec. 2003.*
Equistqar, "Plexar PX 108", printed from equistarchem.com on Jan. 9, 2004.*
Invoice No. 733–019–032—Curlon Grade 1036 dated Jan. 19, 1993 (vendor Copaz Corp.).
Invoice No. 733–039–028—Curlon Grade 1036 dated Feb. 8, 1993 (vendor FDL Foods Inc.).
Invoice No. 733–085–073—Curlon Grade 1036 dated Mar. 26, 1993 (vendor Copaz Corp.).
Invoice No. 733–162–048—Curlon Grade 1036 dated Jun. 11, 1993 (vendor Jennie–O Foods Inc.).

* cited by examiner

Primary Examiner—James J. Seidleck
Assistant Examiner—Melanie Bissett
(74) Attorney, Agent, or Firm—McDermott Will & Emery LLP

(57) ABSTRACT

A clear, multilayer polymeric film that is desirable for thermoforming applications. The film in its various embodiments include two inner layers of nylon and/or a core layer of ethylene vinyl alcohol or ethylene vinyl alcohol copolymer sandwiched between the two inner nylon layers. The film also has an outer layer of a heat sealable polymer and may also have an outer layer of nylon. The film is coextruded, blown into a tubular shape, oriented, and cooled by the method of tubular water quenching. The film has various improved physical properties over the prior art, including properties of "memory", clarity, gloss and low haze.

14 Claims, 2 Drawing Sheets

THERMOFORMABLE MULTILAYER POLYMERIC FILM

This application is a continuation of U.S. application Ser. No. 09/411,671, filed Oct. 4, 1999, now U.S. Pat. No. 6,562,476.

BACKGROUND OF THE INVENTION

This invention is in the field of thermoplastic polymeric films which may be used for the packaging of products, especially food products such as meat and cheese. More specifically, the invention is in the field of polymeric thermoplastic films that are thermoformable i.e., may be softened through the application of heat, distorted to a desired shape, and cooled.

Polymeric films are widely used in the packaging field for the packaging of products, especially food products. Films used for the packaging of food generally contain multiple layers, in which each layer adds certain desired physical or chemical properties to the completed film. For example, an "oxygen barrier layer" serves to protect the packaged food from spoiling. Oxygen barrier properties are necessary to protect many packaged foods over an extended shelf life. Additionally, an "abuse layer" may serve to protect the packaged product from physical abuse or stresses caused by the normal handling of the product during packaging, shipping, or during commercialization.

Although each of the layers of a polymeric film serve a particular purpose, the film itself must be stable, and the layers must remain together and not delaminate.

One polymer typically used as a barrier layer is ethylene vinyl alcohol copolymers ("EVOH") which are also known as saponified or hydrolyzed ethylene vinyl acetate copolymers. In addition to its desirable properties as a barrier to oxygen and other gases, EVOH is also an effective barrier to odors, fragrances, solvents and oils. EVOH also has good properties of processability, i.e. in comparison with other polymers it is relatively easy to process into a layer of a multilayer film. EVOH and EVOH copolymers are generally classified according to ethylene content, for example by mole percent. Typically, as the percentage of ethylene increases in relatively low humidity applications, the gas barrier properties decrease, moisture barrier properties improve, and the resin is more processable. At higher levels of humidity, for example at levels that are common for the packaging of meat, of from 90% to 92% humidity, higher ethylene content results in an increase in the moisture barrier properties.

However, there are in general some difficulties with the use of EVOH copolymer in polymeric films. For example, in comparison with other resins EVOH copolymers have poor impact resistance, poor flex crack resistance, and poor drawability.

In order to protect the EVOH layer, which is as previously noted poor in impact and flex crack resistance, additional layers must be added to cover the EVOH layer. One such layer which may be used to protect the EVOH layer is a layer comprising a polyamide. A polyamide is a high molecular weight polymer having amide linkages along the molecular chain structure. Nylon polyamides, which are synthetic polyamides, have favorable physical properties of high strength, stiffness and abrasion resistance.

It is known in the art of making polymeric films to construct a multilayer film with a barrier layer of EVOH copolymer sandwiched by layers comprising a nylon polyamide. The following patents are of interest in illustrating the prior art polymeric films having a core layer of EVOH between two layers of a nylon.

Commonly owned U.S. Pat. No. 4,284,674, to Sheptak, teaches a polymeric thermal insulation product with EVOH core layer adhered on each side to a nylon layer. The nylon layer is adhered to another layer of a polyolefin, such as an oriented polypropylene.

Commonly owned U.S. Pat. No. 4,355,721, to Knott, teaches at column 5, lines 44 to 52, a multilayer polymeric film for food packaging having a core barrier layer of EVOH sandwiched between two nylon layers. An adhesive layer and HDPE sealant layer are disposed on one side of one of the nylon layers.

Commonly owned U.S. Pat. No. 4,640,852, to Ossian, discloses a multilayer polymeric film with a core layer of EVOH sandwiched between two nylon layers. The film may have additional fourth and fifth layers of an adhesive and a heat sealable polymer, disposed on one side of the nylon layers, and sixth and seventh layers of an adhesive and a LLDPE or propylene-ethylene copolymer disposed on the other nylon layer.

U.S. Pat. No. 4,695,491, to Kondo, teaches a heat shrinkable composite packaging film. The film has a core layer of EVOH which is surrounded on one side by a first layer of a polymer having a low permeability to hot water, and on the opposing side an outermost layer of antiblocking polymer. The outermost layer may be a nylon.

U.S. Pat. No. 4,729,926, to Koteles, discloses at column 4 a polymeric film having the following structure:

tie/nylon/EVOH/nylon/tie/LDPE/primer/outer layer

The outer layer may be any of various polymeric materials that are suitable barrier materials.

U.S. Pat. No. 4,735,855, to Wofford, teaches a seven-layer thermoformable polymeric laminate having the following layer structure:

abuse layer/tie/nylon/EVOH/nylon/tie/sealant

The sealant layer may be any of various sealants, including an ionomer. The abuse layer also serves as a moisture barrier layer.

U.S. Pat. No. 4,746,562, to Fant, disclose s a seven-layer polymeric film having the following layer structure:

LLDPE/tie/nylon/EVOH/nylon/tie/LLDPE

Each of the outer LLDPE layers also comprises an antiblocking agent.

U.S. Pat. No. 4,755,419, to Shah, discloses an oxygen barrier oriented seven layer heat-shrinkable film of the following layer structure:

blend/tie/nylon/EVOH/nylon/tie/blend

The blend used for the outer layers may be a blend of LLDPE, LMDPE and EVA. Alternatively, the outer layers may comprise a blend of ethylene propylene copolymer or polypropylene.

U.S. Pat. No. 4,788,105, to Mueller, teaches an oxygen barrier film which is adhered through use of an adhesive layer to a second film comprising a nylon. The film may also comprise an LLDPE outer layer.

U.S. Pat. No. 4,816,304, to Nohara, teaches a multi-layer gas barrier vessel with a core layer of EVOH sandwiched between two nylon layers, an outer layer of polyester, and an inner layer of polyester.

Commonly owned U.S. Pat. No. 4,818,592, to Ossian, teaches a core layer of EVOH sandwiched between two nylon layers. The film may also include a fourth layer of an adhesive and a fifth layer of a heat sealable polymer. In an alternative embodiment the film may also include a sixth layer of an adhesive and a seventh layer of a heat sealable polymer disposed on the fifth layer.

U.S. Pat. No. 4,833,696, to Iwanami, discloses a laminate with improved flex crack resistance, drawability and modality, and excellent gas impermeability. The laminate comprises a first layer of an EVOH copolymer and a thermoplastic polyester, and a second layer of a composition consisting of a group including nylon.

U.S. Pat. No. 4,855,178, to Langley, discloses a chemical barrier fabric in which a fabric material is laminated to a multilayer film of a layer of EVOH sandwiched between two layers of nylon. A heat-sealable polyethylene layer is disposed on the outside of the sheet material.

U.S. Pat. No. 4,909,726, to Bekele, teaches a multilayer polymeric film for chub packaging of the following layer structure:

heat seal/abuse layer/tie/nylon/EVOH/nylon/tie

The heat seal layer may be selected from the group consisting of ethylene alpha-olefin copolymer, LDPE, and ethylene ester copolymer, and may include an antiblocking agent. The abuse layer may be a very low density polyethylene or alternatively may be an ionomer.

U.S. Pat. No. 4,983,431, to Gibbons, teaches in FIG. 3 a five-layer polymeric film which is laminated to a substrate such as paperboard. The film has the following layer structure:

ionomer/nylon/EVOH/nylon/ionomer

One ionomer layer is laminated to the substrate while the second ionomer layer is coated with a layer of LDPE.

U.S. Pat. No. 4,937,112, to Schirmer, teaches a multilayer blown polymeric film for use in chub packaging. The film has a first outer layer of a heat sealable polymeric resin, such as LLDPE, a first interim layer comprising a polymeric material of high molecular weight such as LDPE, HDPE or EVA, a second interim layer comprising a nylon, and a second outer layer comprising a self-weldable polymeric material.

U.S. Pat. No. 4,999,229, to Moritani, teaches a multilayered polymeric gas barrier film with an intermediate layer of a composition having 50 to 97 weight percent EVOH and 45 to 3 weight percent nylon. As disclosed in Example 1, a layer of nylon may be disposed in contact with the intermediate Layer.

U.S. Pat. No. 5,068,077, to Negi, teaches a multilayer polymeric film with a barrier layer of from 70 to 95 weight percent EVOH and from 5 to 30 weight percent nylon. The barrier layer may be sandwiched between two layers of nylon.

U.S. Pat. No. 5,194,306, to Blatz, teaches a polymeric blend of a major portion of an amorphous nylon and a minor portion of EVOH for use as a gas barrier in a multilayer polymeric film. In an alternative embodiment at column 6, lines 8 to 11, the invention may comprise a two layer structure with one layer of substantially EVOH and one layer of substantially amorphous nylon. At column 8, example 20 discloses a three layer structure comprising a core layer of EVOH sandwiched between two nylon layers.

SUMMARY OF THE INVENTION

It has now been found that a clear multilayer polymeric film of a unique structure, including a core layer of EVOH sandwiched between two nylon layers, or two nylon inner layers and a nylon outer layer, represents an improved multilayer thermoformable polymeric film. The films of the invention are coextruded and then blown into a tubular shape. The films are then cooled by the method of water quenching.

The films of the invention have improved physical properties of "snap back" or "memory" over prior art films. The improved physical properties mean that after the film is used in the packaging of a product the film shrinks or tightly wraps around the product. The films of the invention create a much tighter package than prior art films, and retain tightness over a longer period of time than prior art films.

The films also have improved properties of gloss, and higher clarity and lesser haze than the prior art. The resulting film of the invention produces a packaging material having an improved structure and appearance. The advantages of the films of the invention are especially apparent in thermoforming applications.

The improved physical properties and appearance of the films of the invention are believed to result from the water quenching method in which the films are made. The films are cooled by the application of air as the coextruded film leaves the die. After air cooling the film is cooled by the application of water in direct contact with the film.

In a first embodiment, the film comprises a first core oxygen barrier layer of an EVOH copolymer. The EVOH may comprise up to 44 mole percent ethylene. The EVOH layer is sandwiched between second and third inner layers comprising a nylon, preferably 5 to 35 weight percent of an amorphous nylon copolymer that is blended with one or more various other nylons. Each of the two inner nylon layers may also include a nucleating agent.

Fourth and fifth layers of an adhesive or tie resin are disposed in contact with each of the second and third layers of nylon, respectively. Suitable adhesive resins include anhydride modified polyolefins, such as EVA-based or LLDPE-based adhesives, or any of various other polymeric adhesives that are commonly used in the art of making polymeric films.

Disposed on the fourth adhesive layer is a sixth outer layer of nylon. Similar to the second and third layers of nylon, the sixth layer of nylon preferably comprises from 5 to 35 weight percent of an amorphous nylon copolymer that is blended with other nylons, and may further include a nucleating agent and an antiblocking agent.

The seventh layer of the film, which is disposed in contact with the fifth layer, is a sealant layer. The sealant layer may comprise any of several polymers commonly used in sealant layers, including LDPE, LLDPE, ethylene vinyl acetate ("EVA"), ethylene methyl acrylate ("EMA"), ethyl methyl acrylic acid ("EMAA"), an ionomer, or a blend of any of these polymers.

The first embodiment may alternatively also include an eighth layer disposed in contact with the sixth layer of nylon. The eighth layer comprises an anhydride modified polyolefin, of the type that is commonly used as a polymeric adhesive.

In a second embodiment, the film comprises first and second core layers of nylon. As in the first embodiment, the nylon layers preferably comprise from 5 to 35 percent by weight of an amorphous nylon copolymer that is blended with one or more of various other nylons. Each of the first and second nylon layers may also comprise a nucleating agent.

Disposed between the first and second layers of nylon is a third layer of an adhesive or tie resin. The adhesive resin may be a anhydride modified polyolefin, such as an EVA-based or LLDPE-based adhesive, or any of the various other polymeric adhesives commonly used in the art of making multilayer films. Fourth and fifth layers of the adhesive are disposed in contact with the first and second layers of nylon, respectively.

A sixth outer layer of a nylon is disposed in contact with the fourth layer of an adhesive. Similar to the first and second layers of nylon, the sixth layer preferably comprises from 5 to 35 percent by weight of an amorphous nylon copolymer that is blended with one or more of various other nylons, and may include a nucleating agent and an anti-blocking agent The seventh layer of the film, the sealant layer, preferably comprises a blend of LLDPE and LDPE. The sealant layer may also comprise EVA, the linear polyethylene ULDPE, EMA, EAA, EMAA, an ionomer, or blends of any of these polymers.

In a third embodiment, the film comprises a first core layer of an EVOH copolymer with up to 44 mole percent ethylene. The first layer is sandwiched between second and third layers of nylon. As in the previous embodiments, the second and third layers preferably comprise from 5 to 35 percent by weight of an amorphous nylon copolymer, that is blended with one or more of various other nylons. Each of the second and third layers may also include a nucleating agent. A fourth outer layer of nylon, which like the second and third layers preferably comprises from 5 to 35 percent by weight of an amorphous nylon copolymer that is blended one or more of various other nylons, is disposed in contact with the second layer of nylon. The fourth layer of nylon may also include a nucleating agent.

A fifth layer of an adhesive or tie resin is disposed in contact with the third layer of nylon. Suitable adhesive resins include anhydride modified polyolefins, such as EVA-based or LLDPE-based adhesives.

Disposed in contact with the fifth layer of an adhesive is a sixth layer of an ionomer. Disposed in contact with the sixth layer is a seventh layer, a sealant layer, which may comprise LLDPE. The seventh layer may alternatively comprise EVA, LDPE, ULDPE, EMA, EMAA, EAA, an ionomer, or blends, of any of these polymers.

In a fourth embodiment of the seven layer film, the film comprises a first core barrier layer of an EVOH copolymer having up to 44 mole percent ethylene. The core layer is sandwiched between second and third layers of nylon. As in the previous embodiments, the second and third layers preferably comprise from 5 to 35 weight percent of an amorphous nylon copolymer that is blended with one or more other nylons, and may further include a nucleating agent.

Fourth and fifth layers of an adhesive or tie resin are disposed in contact with the second and third layers of nylon, respectively. Suitable adhesive resins include anhydride modified polyolefins, such as EVA-based or LLDPE-based adhesives, or any of the various other polymeric adhesives that are commonly used in making polymeric films.

Disposed in contact with the fourth layer of an adhesive is a sixth outer layer. The sixth outer layer may comprise a polypropylene, polyester, any of the polyethylenes manufactured by way of a single site catalyst, medium density polyethylene ("MDPE"), linear medium density polyethylene ("LMDPE"), LDPE, LLDPE, EVA, styrene including rubber-modified styrene, or a blend comprising any of these polymers.

A seventh layer, of a sealant, is disposed in contact with the fifth layer. The sealant layer may comprise EVA, LDPE, LLDPE, ULDPE, EMA, EMAA, an ionomer, or blends of any of these polymers.

In a fifth embodiment, the films of the invention comprise a first core barrier layer of an EVOH copolymer having up to 44 mole percent ethylene. The core layer is sandwiched between second and third layers of nylon. As in the previous embodiments, the second and third layers preferably comprise 5 to 35 weight percent of an amorphous nylon copolymer that is blended with one or more various other nylons. Each of the second and third layers may also include a nucleating agent.

A fourth layer of an adhesive or tie resin is disposed in contact with the second layer of nylon. The adhesive layer may comprise anhydride modified polyolefins, such as EVA-based or LLDPE-based adhesives, or of any of various other polymeric adhesives that are commonly used in the making of polymeric films.

A fifth outer layer is disposed in contact with the third layer of a nylon. The fifth layer comprises an anhydride modified polyolefin, of the type that is commonly used as a polymeric adhesive.

Disposed in contact with the fourth layer of an adhesive is a sixth layer of a bulk olefin resin. The sixth layer may be a bulk or general olefin resin of various polymeric substances, particularly low-priced resins. For example, the sixth layer may be a regrind of various scrap polymeric materials. Alternatively, the sixth layer could comprise a variety of low cost resins, including EVA, or one of the various types of polyethylene, including LDPE and LLDPE, or a blend of any of the aforementioned polymers.

Disposed in contact with the sixth layer of a bulk olefin is the seventh layer of a sealant. The sealant layer may comprise EVA, LDPE, LLDPE, ULDPE, EMA, EMAA, an ionomer or blends of any these polymers.

The films of the invention may be of any thickness. A preferred range of thickness is from 2 to 10 mils, and a most preferred range is from 2.5 to 7.5 mils.

DETAILED DESCRIPTION OF THE INVENTION

Figure 1:
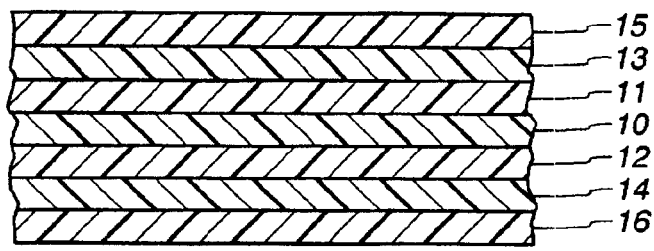
FIG. 1 depicts a first embodiment of the films of the invention.

In its first embodiment, the film of the invention is a seven-layer structure. The film may have any thickness, and preferably has a thickness of from 2 to 10 mils, most preferably from 2.5 to 7.5 mils.

The core or central layer 10 is an oxygen barrier layer which contains ethylene vinyl alcohol ("EVOH") or EVOH copolymer, which is sometimes referred to as saponified ethylene vinyl acetate copolymer. Core layer 10 may have a thickness of between 5 to 20% of the film, preferably about 10%.

EVOH copolymer is well known in the art of making polymeric film for its favorable properties as an oxygen barrier and gas barrier material. The EVOH used in the layer 10 may comprise up to 44 mole percent ethylene, preferably up to 38 mole percent ethylene. Generally, as the percent ethylene content increases, the gas barrier properties of the EVOH copolymer decrease and its moisture barrier properties increase. However, at higher levels of humidity such as at levels of from 90 to 92% humidity that is common in the packaging of meat, higher ethylene content results in an increase in the moisture barrier properties. In addition, as the ethylene content of the EVOH increases its processablity also improves.

The invention contemplates any of the various commonly used EVOH resins for layer 10. Some examples of suitable EVOH resins are LCH101A, manufactured by EVALCA of Lisle, Ill., and ET resin, manufactured by Nippon Gohsei of Japan.

Disposed in contact with either surface of layer 10 of EVOH, thereby forming a sandwich around the EVOH layer 10, are layers 11 and 12 of a nylon. Each of layers 11 and 12 may have a thickness of from 5 to 20% of the thickness of the film, preferably about 10%.

The nylon of layers 11 and 12 may be any of various nylons commonly used in the art of making polymeric films, including nylon 6, nylon 6,6, or nylon 12. However, in a preferred embodiment the nylon comprises an amorphous nylon copolymer that is blended with one or more of various other nylons.

An amorphous nylon copolymer is a particular type of nylon polymer that differs from crystalline or semicrystalline nylons. Amorphous nylon copolymers are characterized by a lack of crystallinity, which can be shown by the lack of an endotherm crystalline melting point in a Differential Scanning Calorimeter ("DSC") test ASTM D-3417.

A lesser degree of crystallinity indicates the ease with which a film can be further fabricated, such as by thermoforming, orienting in the solid state, laminating, or the like. The degree of crystallinity also correlates to the brittleness of the film, and therefore the film's tendency to break or crack when subjected to physical or thermal shock. Physical or thermal shocks generally occur during further converting operations, such as in thermoforming and in the handling involved in fabricating packages, in filling and sealing them, and in shipping the filled and sealed packages in the product distribution system.

An amorphous nylon copolymer is generally a semicrystalline polymer that is made amorphous by rapid quenching of the melt, thereby preventing the development of a crystalline structure and producing a transparent solid. Alternatively, chemical modifications can be made to the chemical backbone of the polymer in order to significantly reduce or eliminate the ability of the polymer chains to organize in an orderly, crystalline arrangement without need for rapid quenching of the melt.

It is known in the art of making polymeric films that amorphous nylon copolymers, like other nylons, are ineffective as moisture barrier layers.

An example of an amorphous nylon copolymer that is suitable for use in the films of the invention is Grivory ® G21, manufactured by EMS—American Grilon, Inc. of Sumter, S.C. Grivory® G21 has a glass transition temperature by the DSC method of approximately 125° C.; a specific gravity of approximately 1.18, as measured by ASTM D792; a moisture absorption after 24 hour immersion of 1.29%, as measured by ASTM D570; and a melt flow index of 90 ml./10 min., as measured by DIN 53735.

Grivory® G21's physical properties include a tensile strength of 10,400 psi, as measured by ASTM D638; 15% elongation at break, as measured by ASTM D638; a flexural strength of 17,300 psi at ASTM D790; a flexural modulus of 416,000 psi at ASTM D790; an Izod impact strength notched of 1.0 ft.-lb./in., as measured by ASTM D256, and a Shore hardness of 80 D-Scale.

In a preferred embodiment, the amorphous nylon copolymer of each of layers 11 and 12 is from 5 to 35 weight percent of each layer. The amorphous nylon copolymer of layers 11 and 12 is blended with any of various other nylons. For example, the amorphous nylon copolymer may be blended with nylon 6, nylon 6,6, nylon 6,12, nylon 12, or a partially aromatic polyamide.

In a preferred embodiment, a nucleating agent is added to the amorphous nylon copolymer, or the amorphous nylon copolymer is blended with a nucleated nylon homopolymer. In a more preferred embodiment, the nucleated homopolymer is a high viscosity nucleated homopolymer, with a viscosity of approximately 120 or above. One such nucleating agent is a high viscosity homopolymer such as 3909 FN, manufactured by Allied Signal Chemical Company.

Layers 13 and 14 are adhesive layers, which comprise any of the various polymeric adhesives commonly used in the art of making polymeric films. For example, layers 13 and 14 may be anhydride modified polyolefins, such as Bynel® 3930 manufactured by E.I. duPont de Nemours & Co., an EVA-based anhydride modified adhesive, or Plexar®, an LLDPE-based adhesive manufactured by Norchem Chemical Co.

Layer 13 may have a thickness of from 5 to 20% of the thickness of the film, preferably about 10%. Layer 14 may have a thickness of from 10 to 40% of the thickness of the film, and is preferably about 20%.

Layer 15 is a nylon outer layer which, like layers 11 and 12, may comprise an amorphous nylon copolymer, such as Grivory® G21, which is blended with one or more of various other nylons. Layer 15 may have a thickness of from 5 to 20% of the thickness of the film, preferably about 10%. Like layers 11 and 12, in a preferred embodiment layer 15 comprises from about 5 to 35 percent of the amorphous nylon copolymer that is blended with various other nylons. The layer may include a nucleating agent. Layer 15 is not a moisture barrier.

In a preferred embodiment, each of nylon layers 11, 12 and 15 comprise the blend of an amorphous nylon copolymer and a nucleated homopolymer. In a more preferred embodiment, only two of the three layers, most preferably layers 12 and 15, comprise the blend of an amorphous nylon copolymer and a nucleated nylon homopolymer.

Layer 15 may further comprise an antiblocking agent, including antiblocking agents which are common in the art of making polymeric films, such as inorganic spheres (especially those derived from a combination of silica and aluminum), talc, diatomaceous earth, silica, calcium carbonate, or other particulate, or combinations of any of these agents. The antiblocking agent serves to roughen the surface of the film, thereby lowering the coefficient of friction between films.

In a preferred embodiment, layer 15 is a layer in which the antiblocking agent is contained in a nylon carrier composition. One such type of carrier composition is disclosed in commonly owned U.S. Pat. No. 5,109,049, the disclosure of which is incorporated herein by reference. As disclosed in the referenced patent at column 2, line 61 to column 3, line 6, nylon carrier compositions are especially effective when used in forming an outer layer of a multilayer packaging film. In a preferred arrangement, the nylon carrier composition is used in an outer layer and a second outer layer is capable of forming a heat seal.

In one type of film made with the nylon carrier composition, a polymeric material comprising 20 to 85 percent nylon is combined with 80 to 15 percent of a nylon carrier composition including antiblocking agent. The nylon carrier composition, which may comprise any of various nylons including nylon 6, nylon 6,6 or nylon 6,66, is from 35 to 80 percent antiblocking agent and 65 to 30 percent nylon polymer.

Alternatively, the film of the nylon carrier composition may be a blend of 95 to 99.5 percent of the nylon polymer and 5 to 0.5 percent of an additive concentrate, in which the additive concentrate includes the antiblocking agent incorporated into a second nylon polymer composition.

A particular antiblocking agent that is preferred for including in the nylon carrier composition is an antiblock agent manufactured by Zeelan Industries of St. Paul, Minn., under the name "Zeeospheres". Zeeospheres are inorganic ceramic spheres comprising silica and alumina. For example, zeeospheres are incorporated as the antiblocking agent in the nylon carrier composition Reed Spectrum antiblock no. 1081274.

Layer 16 is a sealant layer which is capable of forming a heat seal with various other polymeric materials. Heat sealable, as used herein, means sealable or bondable by heat however obtained, for example, by induction or magnetic, ultrasonic, radio frequency, light, laser or other energy sources which cause the materials to bond, fuse or otherwise seal. Such heat sealable materials usually are thermoplastic film forming polymers, are well known in the art, and include ethylene polymers and copolymers, and copolymers of ethylene and an ethylenically unsaturated cononomer selected from the group consisting of carboxylic acids and esters, salts and anhydrides thereof. Layer 16 may comprise any of the various polymers used in a sealant layers, such as LLDPE, including all linear polyethylenes with density up to about 0.95 g/cm, LDPE, EVA, medium density polyethylene ("MDPE"), olefins catalyzed by a single site catalyst, EMA, EMAA, an ionomer, or a blend of any of these polymers, or heat seal coatings. Some examples of the resins that may be used for sealant layer are ULDPE 2256, manufactured by Dow Chemical Company, an octene-based Linear polyethylene, or Dow XU 4909.09.

Layer 16 may have a thickness of between 15 to 40% of the thickness of the film, and is preferably about 30%.

Although not depicted in FIG. 1, the first embodiment may alternatively include an eighth layer disposed in contact with the sixth layer of nylon. The eighth layer comprises an anyhdride modified polyolefin, of the type that is commonly used as a polymeric adhesive. The anhydride modified polyolefin layer may comprise 10 to 20% of the thickness of film.

Figure 2:
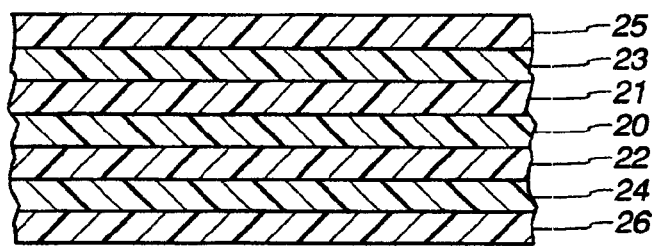
FIG. 2 depicts a second embodiment of the films of the invention.
Figure 3:
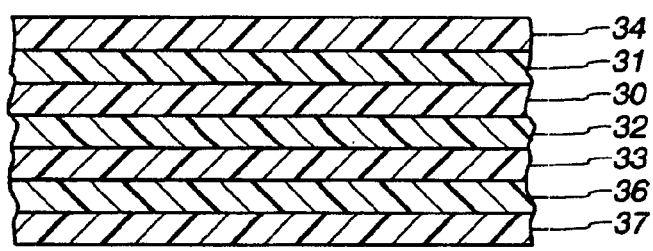
FIG. 3 depicts a third embodiment of the films of the invention.

FIG. 2 depicts the second embodiment of the films of the invention. In this embodiment, the film does not contain a core layer of EVOH.

In its second embodiment, the film may have any thickness, and is preferably of a thickness of from 2 to 10 mils, most preferably from 2.5 to 7.5 mils.

As in the first embodiment, the film has layers 21 and 22 of a nylon, preferably an amorphous nylon copolymer that is blended with a nucleated nylon homopolymer, and more preferably from 5 to 35 percent of an amorphous nylon copolymer. Like layers 11 and 12 in the first embodiment, the amorphous nylon copolymers of layers 21 and 22 are blended with various other nylons. In a preferred embodiment, the amorphous nylon copolymer of layers 21 and 22 is blended with a nucleated nylon homopolymer.

Disposed between layers 21 and 22 is layer 20 of a polymeric adhesive. Additionally, disposed in contact with layers 21 and 22 are layers 23 and 24 of a polymeric adhesive. Layers 20, 23 and 24 may be any of various polymeric adhesives commonly used in the art, for example an anhydride grafted polyolefin adhesive.

Layer 25 comprises a nylon outer layer, which preferably may comprise an amorphous nylon copolymer. Like layers 21 and 22, in a preferred embodiment layer 25 comprises from about 5 to about 35 percent of the amorphous nylon copolymer. The amorphous nylon copolymer of layer 25 is blended with various other nylons. In a preferred embodiment, the amorphous nylon copolymer is blended with a nucleated nylon homopolymer. The layer may also include an antiblocking agent. Like its counterpart nylon outer layer 15 in the first embodiment, the antiblocking agent of layer 25 may be contained in a nylon carrier composition. Layer 25 is not a moisture barrier.

In a preferred version of the second embodiment, each of the nylon layers 21, 22 and 25 comprise a blend of amorphous nylon copolymer and a nucleated homopolymer of nylon 6. In a more preferred embodiment, only two of the layers, most preferably layers 22 and 25, comprise the blend of an amorphous nylon copolymer and a nucleated nylon homopolymer.

Layer 26 is a sealant layer which is capable of forming a heat seal with various other polymeric materials. Layer 26 may comprise any of the various polymers used in a sealant layers, such as LLDPE, LDPE, EVA, EMA, EMAA, an ionomer, or a blend of any of these polymers. A preferred sealant for this embodiment is a blend of LLDPE and LDPE.

In a third embodiment, the film may have any thickness, and is preferably from 2 to 10 mils, most preferably from 2.5 to 7.5 mils.

In its third embodiment, the film has an oxygen barrier core layer 30 of an EVOH copolymer. The EVOH layer used in layer 30 may comprise up to 44 mole percent ethylene, preferably up to 38 mole percent ethylene.

Disposed in contact with either surface of layer 30, thereby forming a sandwich with the EVOH layer in the middle, are layers 31 and 32 of a nylon. Like layers 11 and 12 that form a sandwich about a core EVOH layer in the first embodiment, the nylon of layers 31 and 32 may comprise any of the various nylons commonly used in the art of making polymeric films. In a preferred embodiment, the nylon of layers 31 and 32 is an amorphous nylon copolymer, more preferably from 5 to 35 percent of an amorphous nylon copolymer. The amorphous nylon copolymer is blended with various other nylons such as nylon 6, nylon 6,6, nylon 6,12, nylon 12, or a partially aromatic polyamide.

Layer 33, which is disposed in surface-to-surface contact with layer 32, is an adhesive layer. Like the adhesive layers in both the first and second embodiments of the invention, layer 32 may be any of various commonly used polymeric adhesives including an anhydride modified polyolefin, such as an LLDPE-based anhydride modified polyolefin or an EVA-based anhydride modified polyolefin.

Layer 34 is a nylon outer layer which, like the nylon outer layers of the first and second embodiments, may comprise an amorphous nylon copolymer. In a preferred embodiment, layer 34 comprises from about 5 to 35 percent of the amorphous nylon copolymer. The amorphous nylon copolymer of layer 34 may be blended with various other nylons. Layer 34 is not a moisture barrier.

Layer 34 may further comprise an antiblocking agent, including antiblocking agents which are common in the art of making polymeric films. In a preferred embodiment, layer 34 may include the antiblocking agent in a nylon carrier composition.

Layer 36, which is disposed in surface-to-surface contact with layer 33, is an ionomer such as Surlyn®. Layer 37, which is disposed in surface-to-surface contact with layer 36, is the sealant layer, which is capable of forming a heat seal with various other polymeric materials. Layer 37 may comprise any of various polymers used in sealant layers, such as LLDPE, LDPE, EVA, EMA, EMAA, an ionomer or a blend of any of these polymers. In a preferred embodiment, layer 37 comprises LLDPE.

Figure 4:
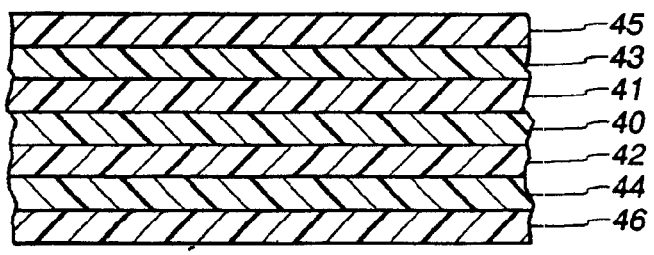
FIG. 4 depicts a fourth embodiment of the films of the invention.

FIG. 4 depicts a fourth embodiment of the films of the invention. In its fourth embodiment the film may have any thickness, and is preferably from 2 to 10 mils, most preferably from 2.5 to 7.5 mils.

In a fourth embodiment, the film has a core layer 40 of an oxygen barrier EVOH material. The EVOH used in layer 40 may comprise up to 44 mole percent ethylene, preferably up to 38 mole percent ethylene.

Disposed in contact with either surface of the EVOH layer 40, so that they form a sandwich around layer 40, are layers 41 and 42 of a nylon. Like the inner nylon layers of the first, second and third embodiments, the nylon of layers 41 and 42 may be any of various nylons commonly used in the art of making polymeric films. In a preferred embodiment, the layer comprises an amorphous nylon copolymer, and preferably comprises from 5 to 35 weight percent of amorphous nylon copolymer. The amorphous nylon copolymer of layers 41 and 42 may be blended with various other nylons. In a further preferred embodiment layers 41 and 42 of an amorphous nylon copolymer include a nucleating agent.

Disposed in contact with layers 41 and 42 are layers 43 and 44 of an adhesive. Layers 43 and 44 may be an anhydride modified polyolefin, such as a LLDPE-based anhydride modified polyolefin or an EVA-based anhydride modified polyolefin.

Layer 45, which is disposed in surface-to-surface contact with layer 43 of an adhesive, is a non-moisture barrier outer layer. The outer layer may comprise any of the following polymers: medium density polyethylene ("MDPE"), LLDPE, LDPE, EVA, styrene, EMA, EAA, EMAA, an ionomer, or blends of any of these polymers.

Layer 46, which is disposed in surface-to-surface contact with layer 44 of an adhesive, is a sealant layer which may comprise any of various polymers used in sealant layers, such as EVA, EMA, EMAA, an ionomer, or blends of any of these polymers.

Figure 5:
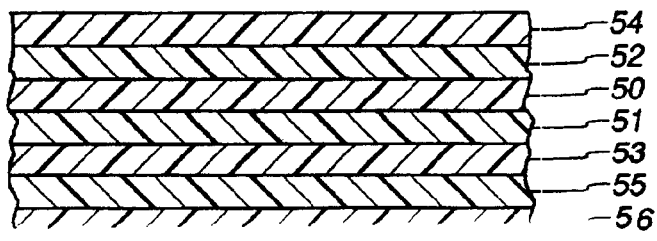
FIG. 5 depicts a fifth embodiment of the films of the invention.

FIG. 5 depicts a fifth embodiment of the films in the invention. In its fifth embodiment the film may have any thickness, and is preferably from 2 to 10 mils, most preferably from 2.5 to 7.5 mils.

In its fifth embodiment, the film has a core layer 50 of an oxygen barrier EVOH material. The EVOH used in layer 50 may comprise up to 44 mole percent ethylene, preferably up to 38 mole percent ethylene.

Disposed in surface-to-surface contact with either surface of the EVOH layer 50, so that they form a sandwich around layer 50, are layers 51 and 52 of a nylon. Like the inner nylon layers of the prior embodiments, the nylon of layers 51 and 52 may be any of various nylons commonly used in the art of making polymeric films. In a preferred embodiment, the layer comprises an amorphous nylon copolymer, and preferably from 5 to 35 weight percent of amorphous nylon copolymer. The amorphous nylon copolymer of layers 51 and 52 may be blended with various other nylons. In a further preferred embodiment layers 51 and 52 of an amorphous nylon copolymer also comprise a nucleating agent.

Disposed in surface-to-surface contact with layer 51 is layer 53 of an adhesive. Layer 53 may be an anhydride modified polyolefin, such as an LLDPE-based anhydride modified polyolefin or an EVA-based anhydride modified polyolefin.

Layer 54, which is disposed in surface-to-surface contact with layer 52, comprises an anhydride modified polyolefin of the type commonly used as a polymeric adhesive. Layer 54 may be from 10 to 20% of the thickness of the film.

Layer 55 is disposed in surface-to-surface contact with layer 53. Layer 55 comprises a bulk polyolefin resin, particularly a low cost resin. Suitable bulk polyolefins include any of the various polyethylenes, EVA, LLDPE, or a regrind of a blend of these or any other polymers. Layer 55 may be from 25 to 40% of the thickness of the film.

Disposed in surface-to-surface contact with layer 55 is layer 56 of a sealant. Layer 56 is capable of forming a heat seal with various other polymer materials. Layer 56 may comprise any of various polymers used in sealant layers, such as LLDPE, LDPE, EVA, EMA, EMAA, an ionomer or a blend of any of these polymers.

The films of the invention may be manufactured by any of various methods common in the art of making polymeric films. Preferably, the films of the invention are melt coextruded in a multilayer coextrusion die according to any one of the layer structures of the various embodiments and then formed in the general manner taught by expired U.S. Pat. No. 3,337,663, to Taga, and expired U.S. Pat. No. 3,090,998, to Heisterkamp, both of which are hereby incorporated by reference. The films are coextruded in a tubular form, wherein the first outer layer of the finished film is the inner layer of the tubular form or tube. The tube is then inflated by the admission of air, cooled, collapsed, and wound up to form a finished roll or rolls.

Figure 6:
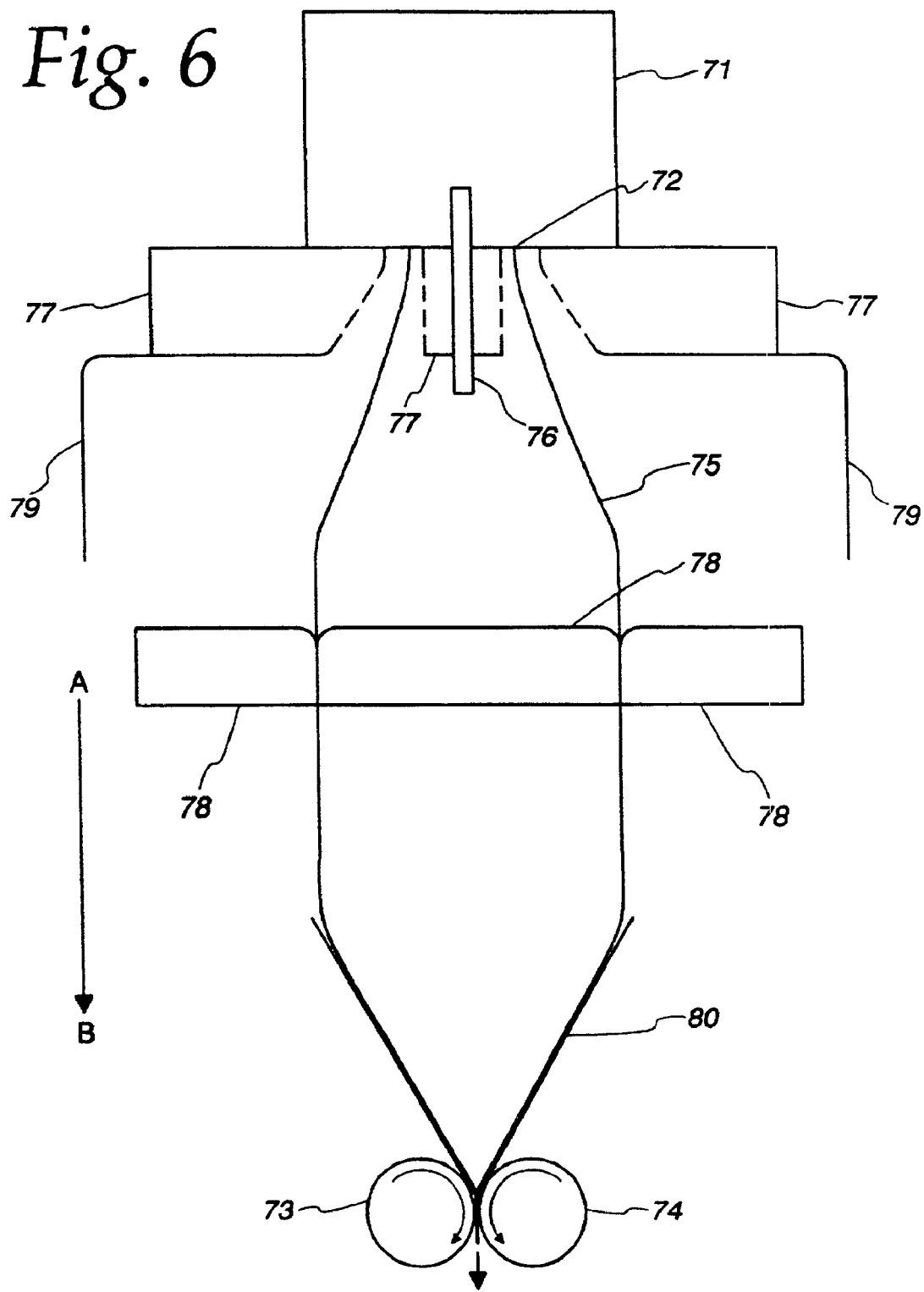
FIG. 6 depicts a method of making the films of the invention.

FIG. 6 depicts a preferred method of manufacturing the films of the invention. A multilayer film according to any of the various embodiments of the invention is coextruded through orifice 72 of die 71 as molten thermoplastic material 75. The molten thermoplastic material 75 is pulled down through collapsing shield 80, in the direction of arrows A to B, by nip rollers 73 and 74. Roller 73 turns upon its axis in a clockwise direction, while roller 74 turns upon its axis in a counter-clockwise direction. Molten thermoplastic material 75 is expanded into a tubular form or "bubble" by inflation caused by a volume of gas injected through gas outlet 76. Gas outlet 76 is located in die 72 such that the exhausting air inflates the bubble.

Air rings 77 are located externally and/or internally of the bubble. As the molten thermoplastic material 75 is inflated into a bubble, the application of air from air rings 77 acts to control the cooling and stabilize the molten thermoplastic material. The air rings 77 can apply air at various temperatures and at a range of velocities. In addition to cooling by air rings 77, thermoplastic molten material 75 is also cooled by water rings or mandrels 78, also located both externally and/or internally of the bubble. Like the air rings, the water rings 78 can apply water at various temperatures and at a range of velocities.

A covering 79 may append from the die to surround the bubble as it exits the die. The length and size of the covering will effect the relative air pressures internally and externally of the bubble.

The method of making the films of the invention as disclosed above results in thermoplastic multilayer films with improved physical properties over prior art films. These improvements are believed to result from the degree of control over the crystallinity of the polymeric film achieved by this method. The crystallinity is first controlled by the application of air though air rings 77. The temperature and velocity of the air applied through air rings 77 controls the degree of crystallinity. Subsequently, the rapid cooling caused by the method of water quenching effectively freezes the amount of crystallization achieved during air cooling in the finished polymeric film.

The water-quenched films of the invention have several improved physical properties over prior art films that are cooled by more conventional methods. For example, the films of the invention have improved clarity and processability.

While the films of the invention have been described in detail above, the invention is not to be construed as limited thereby. This patent is intended to cover all changes and modifications within the spirit and scope thereof.

Having thus described the invention, what is claimed is:

1. A thermoformable multilayer polymeric film, said film comprising:
   a) a first core layer, said first core layer comprising EVOH;
   b) second and third layers, each of said second and third layers disposed in contact with said first core layer, each of said second and third layers comprising a nylon;
   c) a fourth layer comprising an adhesive, said fourth layer disposed in contact with said second layer;
   d) a fifth layer comprising an adhesive and an amorphous nylon copolymer, said fifth layer disposed in contact with said third layer;
   e) a sixth layer comprising a nylon, said sixth layer disposed in contact with said fourth layer; and
   f) a seventh layer, said seventh layer disposed in contact with said fifth layer said seventh layer comprising a heat sealable polymer.

2. A thermoformable multilayer polymeric film as in claim 1, said second and third layers comprising an amorphous nylon copolymer.

3. A thermoformable multilayer polymeric film as in claim 2, said amorphous nylon copolymer of said second and third layers being blended with nylon.

4. A thermoformable multilayer polymeric film as in claim 1, said amorphous nylon copolymer of said fifth layer being blended with a nylon.

5. A thermoformable multilayer polymeric film as in claim 1, said third layer further comprising a nucleating agent.

6. A thermoformable multilayer polymeric film as in claim 1, said sixth layer further comprising an antiblocking agent.

7. A thermoformable multilayer polymeric film as in claim 6, wherein said antiblocking agent is incorporated into a nylon carrier composition.

8. A thermoformable multilayer polymeric film, said film comprising:
   (a) a first core layer, said first core layer comprising EVOH;
   (b) a second layer comprising nylon, said second layer disposed in contact with said first core layer;
   (c) a third layer comprising nylon, said third layer disposed in contact with said first core layer;
   (d) a fourth layer comprising nylon, said fourth layer disposed in contact with second layer;
   (e) a fifth layer comprising an adhesive, said fifth layer disposed in contact with said third layer;
   (f) a sixth layer comprising an ionomer, said sixth layer disposed in contact with said fifth layer; and
   (g) a seventh layer comprising a heat sealable polymer, said seventh layer disposed in contact with said sixth layer, wherein said second, third and fourth layers further comprise an amorphous nylon copolymer.

9. A thermoformable multilayer polymeric film as in claim 8, said third and fourth layers further comprising a nucleating agent.

10. A thermoformable multilayer polymeric film as in claim 8, said fourth layer further comprising an antiblocking agent.

11. A thermoformable multilayer polymeric film as in claim 10, wherein said antiblocking agent is incorporated into a nylon carrier composition.

12. A thermoformable multilayer polymeric film as in claim 10, wherein said seventh layer is an LLDPE copolymer.

13. A thermoformable multilayer polymeric film made by the method of comprising in order:
   (a) coextruding a multilayer polymeric film, wherein said multilayer polymeric film comprises:
      i) a first core layer, the first core layer comprising EVOH;
      ii) second and third layers, each of the second and third layers disposed in contact with the first core layer, each of the second and third layers comprising a nylon;
      iii) a fourth layer comprising an adhesive, the fourth layer disposed in contact with the second layer;
      iv) a fifth layer comprising an adhesive and an amorphous nylon copolymer, the fifth layer disposed in contact with said third layer;
      v) a sixth layer comprising a nylon, the sixth layer disposed in contact with the fourth layer; and
      vi) a seventh layer, the seventh layer disposed in contact with the fifth layer, the seventh layer comprising a heat sealable polymer;
   (b) inflating said film to create a bubble;
   (c) stabilizing said bubble as it is coextruded at a first position;
   (d) quenching said bubble by application of water at a second position;
   (e) collapsing said bubble; and
   (f) winding said bubble at a third position to produce a finished roll.

14. A thermoformable multilayer polymeric film, said film comprising:
   a) a first core layer, said first core layer comprising EVOH;
   b) second and third layers, each of said second and third layers disposed in contact with said first core layer, each of said second and third layers comprising a nylon;
   c) a fourth layer comprising an adhesive, said fourth layer disposed in contact with said second layer;
   d) a fifth layer comprising an adhesive, said fifth layer disposed in contact with said third layer;

e) a sixth layer comprising a nylon, said sixth layer disposed in contact with said fourth layer;

f) a seventh layer, said seventh layer disposed in contact with said fifth layer, said seventh layer comprising a heat sealable polymer; and g) an eighth layer, said eighth layer disposed in contact with said sixth layer, said eighth layer comprising an anhydride modified polyolefin.

* * * * *